United States Patent
Xiang

(10) Patent No.: US 11,244,677 B2
(45) Date of Patent: Feb. 8, 2022

(54) VOICE CONTROL SYSTEM AND METHOD FOR MOVING A COLUMN

(71) Applicant: Loctek Inc., Livermore, CA (US)

(72) Inventor: Lehong Xiang, Ningbo (CN)

( * ) Notice: Subject to any disclaimer, the term of this patent is extended or adjusted under 35 U.S.C. 154(b) by 17 days.

(21) Appl. No.: 16/373,635

(22) Filed: Apr. 3, 2019

(65) Prior Publication Data

US 2020/0320990 A1   Oct. 8, 2020

(51) Int. Cl.
*G10L 15/00*    (2013.01)
*G10L 15/22*    (2006.01)
*B66F 7/28*    (2006.01)

(52) U.S. Cl.
CPC .............. *G10L 15/22* (2013.01); *B66F 7/28* (2013.01); *G10L 2015/223* (2013.01)

(58) Field of Classification Search
CPC .............. G10L 15/22; G10L 2015/223; G10L 2015/225; G10L 15/32; B66F 9/0759; B66F 17/003; G06F 3/0412
See application file for complete search history.

(56) References Cited

U.S. PATENT DOCUMENTS

| | | | | |
|---|---|---|---|---|
| 2014/0278443 A1* | 9/2014 | Gunn | ...................... | G06F 1/3265 704/275 |
| 2015/0175397 A1* | 6/2015 | Lynn | ...................... | G06F 3/04886 187/222 |
| 2016/0148558 A1* | 5/2016 | Ernst | ...................... | G06F 1/1694 345/156 |
| 2016/0272471 A1* | 9/2016 | Jaipaul | ...................... | B66F 3/46 |
| 2017/0018276 A1* | 1/2017 | Gunn | ...................... | G06F 1/3265 |
| 2018/0330727 A1* | 11/2018 | Tulli | ...................... | F24F 11/526 |
| 2019/0077644 A1* | 3/2019 | Jaipaul | ...................... | B66F 3/46 |

OTHER PUBLICATIONS

H. U. Zaman, J. Khisha, N. Zerin and M. H. Jamal, "Speech responsive mobile robot for transporting objects of different weight categories," 2017 18th International Conference on Advanced Robotics (ICAR), Hong Kong, 2017, pp. 395-400, doi: 10.1109/ICAR.2017.8023638. (Year: 2017).*

M. Majewski and W. Kacalak, "Building Innovative Speech Interfaces Using Patterns and Antipatterns of Commands for Controlling Loader Cranes," 2016 International Conference on Computational Science and Computational Intelligence (CSCI), Las Vegas, NV, 2016, pp. 525-530, doi: 10.1109/CSCI.2016.0105. (Year: 2016).*

* cited by examiner

*Primary Examiner* — Edgar X Guerra-Erazo
(74) *Attorney, Agent, or Firm* — W&KIP

(57) ABSTRACT

The disclosure relates to the technical field of lifting mechanisms, and in particular to a voice control system and a method for moving columns, comprising a lifting mechanism, a controller, a storage module, and a voice collection module. The lifting mechanism, the storage module and the voice collection module are all electrically connected to the controller. A control word and at least two wake-up words are stored in the storage module. The system further includes a selection module for selecting the wake-up word and a display module for displaying the current wake-up word. Both the selection module and the display module are electrically connected to the controller. The likelihood of unwanted triggering can be decreased by the voice control system and method.

5 Claims, 1 Drawing Sheet

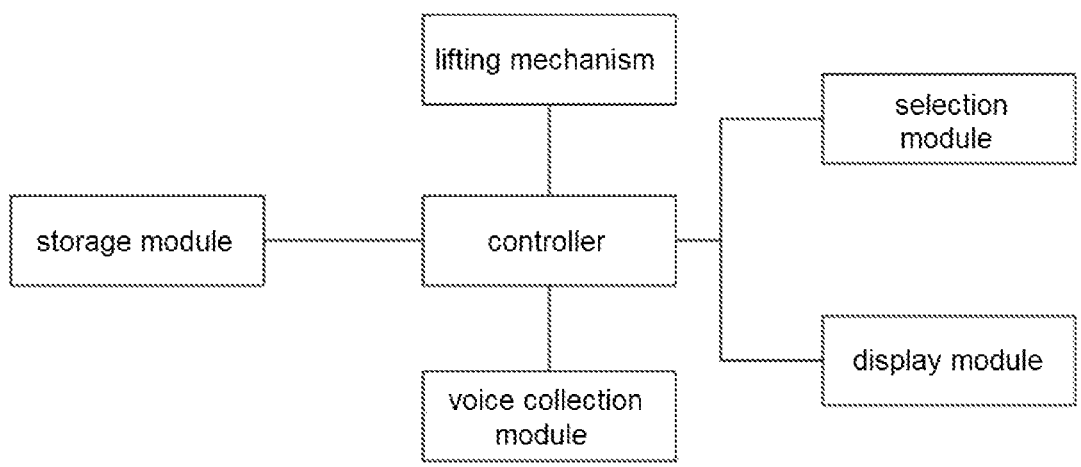

VOICE CONTROL SYSTEM AND METHOD FOR MOVING A COLUMN

TECHNICAL FIELD

The disclosure relates to the technical field of lifting mechanisms, and in particular to a voice control system and method for moving columns.

BACKGROUND

The lifting column is mainly used for lifting and lowering items. It is generally controlled by manual buttons, which are not a convenient way of doing so. The prior art also uses voice control so that it can be awakened by wake-up words and then controlled by control words. But because there may be multiple lifting columns in the same area and the wake-up words of the same type of lifting columns in the prior art would be the same, it is highly possible to cause unwanted triggering and inconvenient usage. The prior art requires semantic matching for voice control, so a control algorithm would be complicated and requires a processor with high computational power to perform the processing, which incurs high cost.

SUMMARY

One technical problem to be solved by the present disclosure is to provide a voice control system for moving a column with a low probability of unwanted triggering.

One technical solution involves a voice control system for moving a column, comprising a lifting mechanism, a controller, a storage module, and a voice collection module. The lifting mechanism, the storage module, and the voice collection module are electrically connected to the controller. A control word and at least two wake-up words are stored in the storage module. The system further includes a selection module for selecting the wake-up word and a display module for displaying the current wake-up word. Both the selection module and the display module are electrically connected to the controller.

In an embodiment, it further comprises a wireless data transmission module. The wireless data transmission module is connected to the controller for receiving an instruction wirelessly to switch the wake-up word.

In an embodiment, the display module is a display screen for displaying a current wake-up word when the wake-up word is switched.

In an embodiment, the display module is a display panel including a plurality of LED lights, and a position of each LED light on the display panel comprises an identifier corresponding to the wake-up word such that when the wake-up word is switched, the LED light corresponding to the switched wake-up word powers on.

Compared with the prior art, the present disclosure has the following advantages: setting at least two wake-up words, and electing a wake-up word through the selection module, and then displaying it through the display module enables the user to select different wake-up words. In this way, even if the same lifting mechanisms are present in the same field, unwanted triggering can be avoided.

Another technical solution involves a voice control method for moving a column, comprising the following steps:

S1: storing characteristic information of a corresponding, sound wave of a wake-up word and a plurality of control words in a controller for moving the column, and storing a control instruction corresponding to each control word;

S2: continuously collecting voice by a voice collection module and sending the collected voice to the controller, matching the stored characteristic information by the controller with a sound wave characteristic of the voice, and manipulating the column to enter a voice control phase if the wakeup word is matched;

S3: continuously collecting voice during the voice control phase and sending the collected voice to the controller, matching the stored characteristic information by the controller with a sound wave characteristic of the voice, and if a control word is matched, sending a control instruction corresponding to the control word to the column and continuing matching;

S4: If another control word is matched, sending another control instruction corresponding to the another control word by the controller to the column, and continuing matching, and if no control word is matched within a set time, exiting the voice control phase and returning to step S2.

In an embodiment, the controller responds with a response voice information after the wake-up word or the control word is matched, each wake-up word or control word corresponds to a different response voice information, and the response voice information is stored in the controller.

In an embodiment, the column further comprises a wake-up word switching mode, at least two different wake-up words are stored in the controller of the column, the voice control is paused in the wake-up word switching mode, and when the user switches to a different wake-up word, the controller matches the switched wake-up word during the wake-up word matching.

In an embodiment, the controller responds with a response voice information according to the different wake-up word when switching to the different wake-up word in the wake-up word switching mode.

In an embodiment, the control instructions corresponding to the control words comprise: lifting, lowering, and stopping.

By switching, the wake-up words in the switching mode, even if the same lifting mechanisms are present in the same field, unwanted triggering can be avoided. The user may have more convenience during usage. Switching different wake-up words will result in different response voices, so that the user can know more clearly which wake-up word is switched and have more convenience. Only three control words are used, which can achieve both good control and small storage calculation.

BRIEF DESCRIPTION OF THE DRAWINGS

FIG. 1 is a block diagram of a voice control system for a lifting column of the present disclosure.

DETAILED DESCRIPTION

The disclosure is further described below by way of specific embodiments, but the disclosure is not limited to the following specific embodiments.

A voice control system for a lifting mechanism comprises a lifting mechanism, a controller, a storage module, a voice collection module, a selection module, a display module, and a voice playback module. The lifting mechanism, the controller, the storage module, the voice collection module, the selection module, the display module, and the voice playback module are electrically connected to the controller.

A control word and at least two wake-up words are stored in the storage module. The system further includes a selection module for selecting the wake-up word and a display module for displaying the current wake-up word. Both the selection module and the display module are electrically connected to the controller.

The lifting mechanism is the lifting device used for driving of the platform or the object to lift or lower. It is a common equipment in the prior art having a power mechanism which is usually a motor, and it is not described in further detail herein.

The storage module is a module for storing data, and it is also conventional in the prior art. The wake-up words and the control words are stored in the storage module, and the wake-up words are at least two in number. The wake-up words may be "Xiaole" and "Xiaoge". "Lele", etc. The control words are at least three in number according to normal operations, which may include lifting, stopping or lowering, respectively. These three control words can extend to synonyms or other phonetic words, that is, control words can be more than three in number, but there are only three control instructions. The sound wave characteristic information of the wake-up words and the control words is stored in the storage module.

The voice collection module mainly collects voice, and is generally a microphone.

The selection module is generally a button module to enable selection, or a wireless data transmission module may be set to enable selection by a wireless terminal.

The display module is a display panel including a plurality of LED lights, and a position of each LED light on the display panel comprises an identifier corresponding to the wake-up word such that when the wake-up word is switched to, the LED light corresponding to the switched wake-up word powers on.

The voice playing module is generally a speaker or a sound generator and is mainly used for playing a response voice. The response voice corresponding to the wake-up word is "Hello, wake-up word is ready to serve you", such as "Hello, Xiaole is ready to serve you". The response voice corresponding to the control word is "received, execute control word operation", such as "received, perform lifting operation".

The controller, which is a common processor, has only the function of comparing the characteristics of the voice sound wave, and does not have the function of performing semantic matching. So its cost is lower, and it is also a conventional product of the prior arts. The controller is not described in further detail herein.

Two control methods are provided for the control system. The first method does not involve switching of wake-up words and it comprises the following steps:

S1: storing characteristic information of a corresponding sound wave of a wake-up word and a plurality of control words in a controller for moving the column, and storing a control instruction corresponding to each control word;

S2: continuously collecting voice by a voice collection module and sending the collected voice to the controller, matching the stored characteristic information by the controller with a sound wave characteristic of the voice, and manipulating the column to enter a voice control phase if the wakeup word is matched;

S3: continuously collecting voice during the voice control phase and sending the collected voice to the controller, matching the stored characteristic information by the controller with a sound wave characteristic of the voice, and if a control word is matched, sending a control instruction corresponding to the control word to the column and continuing matching;

S4: If another control word is matched, sending another control instruction corresponding to the another control word by the controller to the column, and continuing matching, and if no control word is matched within a set time, exiting the voice control phase and returning to step S2.

In a specific embodiment, the user speaks a wake-up word, such as "Xiaole". The voice collection module collects the voice information, and then sends the collected sound wave characteristic information to the controller. The controller compares it to the stored sound wave characteristics. If the wake-up word "Xiaole" is matched to the collected voice information, the controller controls the speaker to send a response voice of "Hello, Xiaole is ready to serve you", and controls the column to enter the voice control phase. The user hears the response voice and notices that the system has entered the voice control phase, and then the user speaks the control word, such as "rise". The voice collection module collects the voice information, and then sends the collected sound wave characteristic information to the controller. The controller compares the stored acoustic wave characteristic information to match the control word "rise" with the collected voice information. The controller subsequently controls the speaker to issue "received, execute operation", and controls the lifting mechanism to start executing a lifting movement. If a different control word is collected as the controller controls the lifting mechanism to perform the operation, the controller performs a corresponding operation according to the newly acquired control word. If no control word is matched within 1 minute after entering the voice control phase, the system automatically exits the voice control phase and returns to normal operation. In the normal operation phase, the controller will not control the lifting mechanism to perform operation according to the collected control words even if the user is speaking the control word.

There is also a second method with wake-up word switching, which differs from the above method in that the controller stores at least two wake-up words, and the user needs to select the wake-up words at the beginning, such as selecting through a button module or a remote control. After that the system will display the selected wake-up word on the display module, and when the wake-up word is being selected, the system's voice control will be suspended. Only after the user selects the wake-up word may the controller perform wake-up word matching.

It should be noted that the above embodiments are only for explaining the technical solutions of the present invention, and are not intended to be limiting; although the present invention has been described in detail with reference to the foregoing embodiments, those skilled in the art will understand that The technical solutions described in the foregoing embodiments are modified, or some of the technical features are replaced equally; and the modifications or substitutions do not deviate from the spirit and scope of the technical solutions of the embodiments of the present invention.

I claim:

1. A voice control method for moving a column, comprising the following steps:
   S1: storing characteristic information of a corresponding sound wave of a wake-up word and a plurality of control words in a controller for moving the column, and storing a control instruction corresponding to each control word;

S2: continuously collecting voice by a voice collection module and sending the collected voice to the controller, matching the stored characteristic information by the controller with a sound wave characteristic of the voice, and manipulating the column to enter a voice control phase if the wakeup word is matched;

S3: continuously collecting voice during the voice control phase and sending the collected voice to the controller, matching the stored characteristic information by the controller with a sound wave characteristic of the voice, and if a control word is matched, sending a control instruction corresponding to the control word to the column and continuing matching;

S4: If another control word is matched, sending another control instruction corresponding to the another control word by the controller to the column, and continuing matching, and if no control word is matched within a set time, exiting the voice control phase and returning to step S2.

2. The voice control method according to claim 1, wherein the controller responds with a response voice information after the wake-up word or the control word is matched, each wake-up word or control word corresponds to a different response voice information, and the response voice information is stored in the controller.

3. The voice control method according to claim 1, wherein the column further comprises a wake-up word switching mode, at least two different wake-up words are stored in the controller of the column, the voice control is paused in the wake-up word switching mode, and when the user switches to a different wake-up word, the controller matches the switched wake-up word during the wake-up word matching.

4. The voice control method according to claim 3, wherein the controller responds with a response voice information according to the different wake-up word when switching to the different wake-up word in the wake-up word switching mode.

5. The voice control method according to claim 1, wherein the control instructions corresponding to the control words comprise: lifting, lowering, and stopping.

* * * * *